US012716009B2

(12) United States Patent
Keil et al.

(10) Patent No.: US 12,716,009 B2
(45) Date of Patent: Aug. 25, 2026

(54) SOLVENT-BORNE, TWO-PACK, ANTICORROSION COATING COMPOSITION

(71) Applicant: BASF COATINGS GMBH, Münster (DE)

(72) Inventors: Patrick Keil, Münster (DE); Thorsten Gelbrich, Münster (DE); Nicole Roth, Münster (DE); Silvia Lenter, Münster (DE); Renate Wegner, Münster (DE); Sebastian Poehlker, Münster (DE)

(73) Assignee: BASF COATINGS GMBH, Muenster (DE)

( * ) Notice: Subject to any disclaimer, the term of this patent is extended or adjusted under 35 U.S.C. 154(b) by 588 days.

(21) Appl. No.: 18/043,114

(22) PCT Filed: Aug. 26, 2021

(86) PCT No.: PCT/EP2021/073584
§ 371 (c)(1),
(2) Date: Feb. 27, 2023

(87) PCT Pub. No.: WO2022/043421
PCT Pub. Date: Mar. 3, 2022

(65) Prior Publication Data

US 2023/0332011 A1 Oct. 19, 2023

(30) Foreign Application Priority Data

Aug. 28, 2020 (EP) .................................... 20193362

(51) Int. Cl.
*C09D 163/00* (2006.01)
*C09D 5/08* (2006.01)
*C09D 175/06* (2006.01)

(52) U.S. Cl.
CPC ........... *C09D 163/00* (2013.01); *C09D 5/086* (2013.01); *C09D 175/06* (2013.01)

(58) Field of Classification Search
CPC ..... C09D 163/00; C09D 5/086; C09D 175/06
See application file for complete search history.

(56) References Cited

U.S. PATENT DOCUMENTS 4,304,707 A 12/1981 Kuehn

FOREIGN PATENT DOCUMENTS

| | | | | |
|---|---|---|---|---|
| CN | 108950567 | A | | 12/2018 |
| CN | 109627935 | A | | 4/2019 |
| JP | S56104926 | A | | 8/1981 |
| JP | S62172526 | A | | 7/1987 |
| JP | 2006348105 | A | | 12/2006 |
| JP | 2013203952 | A | * | 10/2013 |
| JP | 201787164 | A | | 5/2017 |
| JP | 6159102 | B2 | | 7/2017 |
| KR | 20200022096 | A | | 3/2020 |
| WO | 2014074397 | A1 | | 5/2014 |

OTHER PUBLICATIONS

Machine Translation of Guo et al. (CN 109627935 A) (Year: 2019).*
Ulaeto et al "Smart nanocontainer-based anticorrosive bio-coatings: Evaluation of quercetin for corrosion protection of aluminium alloys", Progress in Organic Coatings 136 (2019)). (Year: 2019).*
International Search Report and Written Opinion for corresponding PCT/EP2021/073584 mailed Nov. 3, 2021, 10 pages.
Ulaeto et al. "Smart nanocontainer-based anticorrosive bio-coatings: Evaluation of quercetin for corrosion protection of aluminium alloys," Progress in Organic Coatings, Elsevier BV, NL, vol. 136, Sep. 4, 2019.

* cited by examiner

*Primary Examiner* — Jiangtian Xu
(74) *Attorney, Agent, or Firm* — Armstrong Teasdale LLP

(57) ABSTRACT

Disclosed herein is a solvent-borne, two-pack coating composition. Further disclosed is a method of producing the coating composition, a method for coating and the coatings obtained therein, and the use of compounds (II) and (III) as corrosion inhibitors.

(II)

(III)

20 Claims, No Drawings

SOLVENT-BORNE, TWO-PACK, ANTICORROSION COATING COMPOSITION

CROSS-REFERENCE TO RELATED APPLICATIONS

This application is a U.S. National Phase Application of International Patent Application No. PCT/EP2021/073584, filed Aug. 26, 2021, which claims priority to European Patent Application No. 20193362.9, filed Aug. 28, 2020, each of which is hereby incorporated by reference herein.

FIELD OF THE INVENTION

The present invention relates to a solvent-borne, two-pack coating composition comprising (A) at least a pigmented and/or filled master batch component comprising at least one polyhydroxyl functional aromatic organic compound and at least one polymer and/or resin having functional groups which are reactive towards at least one crosslinking agent comprised in a hardener component (B); (B) a hardener component and optionally (C) a solvent component. The present invention further relates to a method of producing the coating compositions, a method of coating a metallic substrate with the coating composition and thus coated substrates, particularly multi-layer coated substrates and their production as well as the use of the polyhydroxyl functional aromatic organic compounds in solvent-borne, two-pack coating composition to provide anticorrosive properties to the cured coatings formed from the coating compositions.

BACKGROUND

In many fields of coating metallic parts, such as the field of automotive refinish coating, coating of commercial vehicles and coating of aircrafts, for example, and also in the case of large-scale technical mechanical systems such as wind energy systems, it is customarily necessary to protect the respective metallic components used, especially components made of aluminum and/or aluminum alloys, against corrosion by use of anticorrosion coatings. The requirements imposed on the corrosion prevention that is to be obtained are very high, especially since the manufacturers often offer a guarantee against corrosion penetration over many years.

However, corrosion of aluminum differs from the corrosion of iron containing substrates significantly. Particularly filiform corrosion is often observed on aluminum-based substrates such as pure aluminum or aluminum alloys.

In many cases anticorrosion pigments are employed in coating compositions to protect the metallic substrates from corrosion, but the use of anticorrosion pigments is often accompanied by environmentally problematic use of inorganic lead-based or chromate-based anticorrosion pigments or certain problematic organic corrosion inhibitors. Moreover, such pigments are typically employed in large amounts, and may thus significantly alter the properties of the coating compositions besides their main aim to provide corrosion protection.

Particularly in two-pack coating compositions, wherein highly reactive polymers, resins and/or crosslinkers are employed, such as automotive refinish coating compositions, certain organic corrosion inhibitors will be consumed by reaction with such polymers, resins and/or crosslinkers and are therefore not deemed to be effective.

For example, Ulaeto et al. propose in their scientific article with the title "Smart nanocontainer-based anticorrosive bio-coatings: Evaluation of quercetin for corrosion protection of aluminum alloys" (Progress in Organic Coatings 136 (2019) 105276) the encapsulation of quercetin into mesoporous silica nanocontainers and the use of the encapsulated quercetin in room temperature curing, solvent-free, two-pack coating compositions. The idea is to protect quercetin by encapsulation from reactive components of the coating composition, so that the encapsulated quercetin remains in the nanocontainers in the cured composition until a corrosion event, caused by a rise in pH value to about 10, occurs. Thus, employing organic corrosion inhibitors in coating compositions without prior protective nano-encapsulation, will typically lead to an undesired inactivation of such corrosion inhibitors during the curing step. However, while encapsulated organic corrosion inhibitors may not participate in the crosslinking reaction, their corrosion protective action is limited to pH changes to very high pH values to become effective. Corrosion of metallic substrates such as aluminum containing substrates may however be causes by different mechanisms, too, not just by a rising pH value, which is necessary to release organic corrosion inhibitors from mesoporous silica nanocontainers. Particularly, corrosion under acidic conditions or in an acidic environment may occur, where the release mechanism of action of such encapsulated inhibitors is not effective.

Even though particularly aluminum-based substrates should be protected from corrosion, the coating materials should also be suitable to employ corrosion resistance to other metallic substrates such as different kinds of steel.

While the known art often makes use of the crosslinking enhancing properties of some anticorrosive pigments or specific organometallic or metal containing catalyst to, it was the aim of the present invention to achieve excellent anticorrosive properties with primer coating compositions and/or filler coating compositions by employing specific polyhydroxyl functional organic compounds, even compounds occurring in nature and therefore being environmentally non-problematic. Particularly, the corrosion inhibitors to be used in the coating materials of the present invention should be effective without the need of a pH change, even at a low pH value environment and without the need to be protected from the components forming the matrix material of the cured coating. With other words there should be no need to encapsulate the corrosion inhibitors used in the present invention, e.g. in mesoporous silica nanocontainers. Further, if corrosion takes place without pH change, thus encapsulated inhibitors would be ineffective, because they would not be released from the encapsulation material.

It was the aim of the present invention to overcome the afore-mentioned drawbacks of the known art and to provide a two-pack coating material which can be applied by spray application as particularly used in automotive refinish coating and which is apt to provide corrosion protection to different metal substrates and multi-metal substrates, particularly to aluminum comprising substrates even without pre-treatment and without the need for encapsulation of the corrosion inhibitor such as an incorporation into mesoporous silica nanocontainers or the like. Furthermore, the corrosion inhibitor employed should already be effective at very little concentrations in the coating material, thus minimizing detrimental effects and changes in the overall properties of the coating material.

SUMMARY OF THE INVENTION

The problems addressed by the invention are solved by providing a solvent-borne, two-pack coating composition, comprising (A) a master batch component comprising a. one or more polymers and/or resins comprising functional groups, which are reactive toward the functional groups of the one or more crosslinking agents comprised in hardener component (B);

b. one or more pigments and/or fillers; and c. one or more species containing a structural unit of formula (I)

(I)

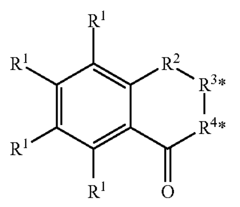

wherein two of the four residues $R^1$ are OH and the other two residues $R^1$ are H; $R^2$=O or C=O; and $R^3$—$R^4$ is C=C or HC—CH; with the asterisks * depicting binding sites to residues $R^5$ and $R^6$ in formula (II) below or the residue CH—CH—CH—CH in formula (III) below; and the one or more species being selected from the group consisting of species of formula (II)

(II)

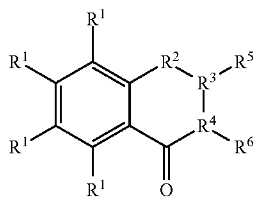

wherein $R^5$ being

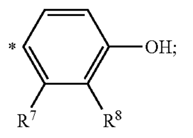

and $R^6$=H or OH, the asterisk depicting the binding site to $R^4$; and $R^7$ and $R^8$ are H or OH, with the proviso that at least one of $R^7$ and $R^8$ is H; and $R^2$ being 0; and species of formula (III)

(III)

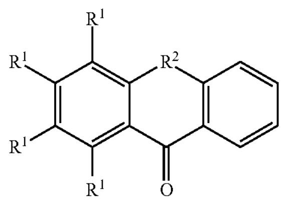

wherein $R^2$=C=O; and (B) a hardener component comprising one or more crosslinking agents comprising functional groups, which are reactive towards the functional groups of the one or more polymers and/or resins of the master batch component (A); and optionally (C) a solvent component.

The present invention further provides a method of producing the coating compositions of the present invention.

Furthermore, the present invention provides a method of coating a metallic substrate, particularly an aluminum containing metallic substrate with a coating composition according to the present invention and the thus coated substrates.

Yet another object of the present invention is a multi-layer coated substrate and a method of its production.

A further object of the present invention is the use of one or more species of formulae (II) and (III) as defined above in solvent-borne, two-pack coating compositions, particularly to provide anticorrosive properties to the cured coatings formed from the coating compositions.

Solvent-Borne, Two-Pack Coating Composition of the Present Invention

The coating composition of the invention is preferably in the form of a dispersion or solution, more particularly in the form of a dispersion.

The fractions in weight % of all of the components present in the coating composition of the invention, in other words of components (A), (B), optionally (C), and optionally (D) described below, preferably add up in each case to 100 wt-%, based on the total weight of the coating composition of the invention.

The coating composition of the invention is a solvent-borne, i.e., solvent-based or nonaqueous, coating composition.

The terms "solvent-borne", "solvent-based" or "nonaqueous" in connection with the coating composition of the invention preferably mean, a coating composition which as its liquid dilution medium, i.e., as liquid solvent and/or dispersion medium, comprises at least one organic solvent as principal component (in terms of the dilution media employed). The fraction of organic solvents in the coating composition of the invention is preferably at least 95.0 wt-% or at least 96.0 wt-% or at least 97.0 wt-%, most preferably at least 99 wt-% or at least 99.5 wt-% or at least 99.9 wt-%, based in each case on the total fraction of the liquid dilution media present in the coating composition. The liquid dilution media can be present in the master batch component, the hardener component and/or the solvent component or further ingredients or components, if present.

The viscosity of the coating compositions of the present invention is preferably a viscosity suitable for spray application with a spray gun as e.g. used in automotive refinish coating. Preferably the viscosity of the coating compositions of the present invention determined with a DIN Cup 4 (according to DIN 53211:1987-06) at a temperature of 20° C. is below 30 seconds, more preferred below 25 seconds and particularly preferred between 15 and 25 seconds such as between 17 and 23 seconds.

The coating composition of the invention preferably has a nonvolatile fraction in the range from 30 to 90 wt-%, more preferably in the range from 40 to 80 wt-%, very preferably in the range from 45 to 75 wt %, more particularly from 55 to 70 wt %, most preferably from 60 to 65 wt %, based in each case on the total weight of the coating composition.

The term "non-volatile fraction" as used herein is the calculated total amount of all film-forming ingredients, including all additives, pigments and fillers as employed in the respective coating composition. Thus, the non-volatile fraction does not include the solvents.

The term "two-pack" or "two-component", referring to coating compositions, relates to such coating compositions, where the chemical reaction, which leads to crosslinking is initiated by mixing two components (master batch and hardener), in a ratio predetermined by the manufacturer (DIN 55945: 1996-09) to effect curing to form a durable coating. The individual components are no coating materials, as they are either not suitable for or capable of film formation or do not form durable coatings. The mixture must be processed within a certain period of time (pot life or processing time), since processability and film formation deteriorate after expiration of the of this time. In two-component-spraying systems, this is typically unproblematic, because the mixing here only takes place directly before application in the spraying process (Römpp Lexikon, Lacke und Druckfarben, Georg Thieme Verlag 1998; keyword: "Zweikomponenten-Lacke").

The solvent-borne, two-pack coating composition of the present invention is preferably crosslinkable at temperatures in the range from 18° C. to 90° C.

The coating composition of the invention is preferably a primer coating composition or a filler coating composition, i.e., a coating composition which is suitable for producing a primer coating or a filler coating. The terms "primer (coating composition)" (in German: "Primer") and "filler (coating composition)" (in German: "Fuller") is known to the skilled person and is defined for example in Römpp Lexikon, Lacke und Druckfarben, Georg Thieme Verlag 1998.

Masterbatch Component (A)

(A)a. Polymers and/or Resins Comprising Functional Groups

The master batch component (A) comprises one or more polymers and/or resins comprising functional groups, which are chemically reactive with the functional groups of the one or more crosslinking agents of the hardener component (B).

One preferred type of polymers and/or resins are polyhydroxyl functional polymers and/or resins selected from the group consisting of polyesters, polyethers, polyether-polyesters, polyurethanes and poly(meth)acrylates. In such polymers and resins the functional groups which are chemically reactive with the functional groups of the one or more crosslinking agents of the hardener component (B) comprise at least two hydroxyl groups. However, the present invention does not exclude other functional groups which are chemically reactive with the functional groups of the one or more crosslinking agents of the hardener component (B), such as e.g. primary or secondary amine groups.

For the purposes of the present invention, the expression "(meth)acryloyl" or "(meth)acrylate" encompasses in each case the definitions "methacryloyl" and/or "acryloyl", or "methacrylate" and/or "acrylate", respectively. Therefore, poly(meth)acrylates may be obtained by polymerizing acrylate monomers, methacrylate monomer or both, optionally including other ethylenically unsaturated monomers.

A second type of preferred polymers and/or resins, which are chemically reactive with the functional groups of the one or more crosslinking agents of the hardener component (B) contains at least two oxirane groups. Such polymers or resins are typically called epoxy resins. However, epoxy groups may also be incorporated into poly(meth)acrylates by use of oxirane group containing ethylenically unsaturated monomers in the polymerization reaction.

Polyhydroxyl Functional Polymers and/or Resins

Polyhydroxyl-functional polymers and/or resins contain on average at least two hydroxyl groups per polymer molecule or resin molecule.

As polyhydroxyl-functional polymers and/or resins, it is possible to use all compounds known to the skilled person which have at least two hydroxyl groups per molecule on average and which are oligomeric and/or polymeric. As polyhydroxyl-functional polymers and/or resins it is also possible to use mixtures of different oligomeric and/or polymeric polyols.

Preferably, the polyhydroxyl-functional polymers and/or resins have mass-average molecular weights Mw>500 g/mol, measured by means of gel permeation chromatography (GPC) against a polystyrene standard, specifically between 800 and 100,000 g/mol, more particularly between 1000 and 50,000 g/mol.

Particularly preferred polyhydroxyl-functional polymers and/or resins are selected from the group consisting of polyester polyols, polyurethane polyols, polysiloxane polyols and poly(meth)acrylate polyols.

Preferably, the polyhydroxyl-functional polymers and/or resins have a hydroxyl number of 30 to 400 mg KOH/g, more preferred between 100 and 300 KOH/g. The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resultant acid is titrated with potassium hydroxide solution (DIN 53240-2). In the case of pure poly(meth)acrylates, the OH number may also be determined with sufficient accuracy by calculation on the basis of the OH-functional monomers used.

Preferably, the glass transition temperatures of the polyhydroxyl-functional polymers and/or resins, measured by means of DSC measurement in accordance with DIN EN ISO 11357-2, between −150 and 100° C., more preferably between −120° C. and 80° C.

Suitable polyester polyols are described in EP-A-0 994 117 and EP-A-1 273 640, for example. In one or more embodiments, polyurethane polyols are prepared by reaction of polyester polyol prepolymers with suitable di- or polyisocyanates, and are described in EP-A-1 273 640, for example. Suitable polysiloxane polyols are described in WO-A-01/09260, for example, and the polysiloxane polyols recited therein may be employed preferably in combination with other polyols, more particularly those having higher glass transition temperatures.

Most preferred, polyhydroxyl-functional polymers and/or resins comprise one or more poly(meth)acrylate polyols. Together with the poly(meth)acrylate polyol(s) it is possible polyhydroxyl-functional polymers and/or resins to be employed, examples being polyester polyols, polyurethane polyols, and polysiloxane polyols, especially polyester polyols.

Preferably, the poly(meth)acrylate polyols that can be used are copolymers and have mass-average molecular weights Mw of between 1000 and 20,000 g/mol, more particularly between 1500 and 10,000 g/mol, in each case measured by means of gel permeation chromatography (GPC) against a polystyrene standard.

Preferably, the glass transition temperature of the poly (meth)acrylate polyol copolymers is between −100 and 100° C., more particularly between −60 and <20° C. (measured by means of DSC measurements in accordance with DIN-EN-ISO 11357-2).

Preferably, the poly(meth)acrylate polyol copolymers have an OH number of 60 to 300 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed for the neutralization of 1 g of the compound in question (DIN EN ISO 2114).

Preferably, as hydroxyl-functional monomer building blocks hydroxyalkyl (meth)acrylates, such as more particularly 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate are used.

As further monomer building blocks for the poly(meth) acrylate polyol copolymers alkyl (meth)acrylates, such as preferably ethyl (meth)acrylate, propyl (meth)acrylate, isopropyl (meth)acrylate, butyl (meth)acrylate, isobutyl (meth) acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate or lauryl (meth)acrylate; cycloalkyl (meth)acrylates, such as cyclopentyl (meth)acrylate, isobornyl (meth)acrylate or cyclohexyl (meth)acrylate are used.

As further monomer building blocks for the poly(meth) acrylate polyol copolymers it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, preferably in minor amounts, in particular, acrylic and/or methacrylic acid.

Epoxy Resins

Epoxy resins contain more than one oxirane ring and can be converted into cured epoxy resins with the crosslinking agent through reaction of the oxirane rings. Customary epoxy resins are prepared by reaction of reactive phenols, alcohols, acids, and amines with epichlorohydrin, and contain the oxirane rings in the form of a glycidyl group. The number of reactive structures forming epoxy resins through a reaction with epichlorohydrin is virtually unlimited, and so there are a large number of industrially available resins. Furthermore, unsaturated aliphatic and cycloaliphatic compounds have been epoxidized directly using peracetic acid, for example.

In principle all epoxy resins that are commonly used in formulating solvent-borne, two-pack coating compositions can be used for the purposes of the present invention. The epoxy resins which can be used in accordance with the invention are preferably those selected from the group consisting of glycidyl ethers, such as bisphenol-A-diglycidyl ether, bisphenol-F-diglycidyl ether, epoxide-novalak, epoxide-o-cresol-novolak, 1,3-propane-, 1,4-butane- or 1,6-hexane-diglycidyl ethers and polyalkylene oxide glycidyl ethers; glycidyl esters, such as diglycidyl hexahydrophthalate; glycidylamines, such as diglycidylaniline or tetraglycidylmethylenedianiline; cycloaliphatic epoxides, such as 3,4-epoxycyclohexylepoxyethane or 3,4-epoxycyclohexylmethyl-3,4-epoxycyclo-hexanecarboxylate; and glycidyl isocyanurates, such as trisglycidyl isocyanurate.

(A)b. Pigments and/or Fillers

The master batch component (A) further comprises one or more pigments and/or fillers.

The term "pigment" is known to the skilled person from DIN 55945 (date: October 2001), for example. A "pigment" within the meaning of the present invention refers preferably to compounds in powder or platelet form which are insoluble substantially, preferably completely, in the medium surrounding them, such as in the coating composition of the invention. Pigments as defined herein differ from "fillers" at least in their refractive index, which for pigments is 1.7.

Suitable pigments are preferably selected from the group consisting of organic and inorganic color-imparting pigments (including black and white pigments), effect pigments and mixtures thereof.

Examples of suitable inorganic color-imparting pigments are white pigments such as zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow, or bismuth vanadate. Examples of further inorganic color-imparting pigments are e.g. aluminum oxide, aluminum oxide hydrate, in particular boehmite, titanium dioxide, zirconium oxide, cerium oxide and mixtures thereof. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Effect pigments include metallic effect pigments, but also pearlescent pigments and the like.

The term "filler" is known to the skilled person, from DIN 55945 (date: October 2001), for example. A "filler" within the meaning of the present invention refers preferably to a substance which is substantially insoluble, preferably completely insoluble, in the coating composition of the invention, and is used more particularly for increasing the volume. "Fillers" within the meaning of the present invention at least differ from "pigments" in their refractive index, which for fillers is $<1.7$. Any customary filler known to the skilled person may be used. Examples of suitable fillers are kaolin, dolomite, calcite, chalk, calcium sulfate, barium sulfate, graphite, silicates such as magnesium silicates, more particularly corresponding phyllosilicates such as hectorite, bentonite, montmorillonite, talc and/or mica, silicas, more particularly fumed silicas, hydroxides such as aluminum hydroxide or magnesium hydroxide, or organic fillers such as textile fibers, cellulose fibers, polyethylene fibers, or polymer powders; for further details refer to Römpp Lexikon Lacke und Druckfarben, Georg Thieme Verlag, 1998, pages 250 ff., "Fillers".

While the afore-mentioned pigments and filler can suitably be employed in the coating composition of the present invention, such pigments containing environmentally problematic elements such as Pb, Cd, Cr, Cu, Mo, Hg, Se or Zn are less preferred and most preferably not included in the coating composition of the present invention.

While the pigments and/or fillers as listed above may include silica, it is explicitly stated herewith that mesopourous silica nanocontainers or silica, which contain encapsulated species of formulae (II) and (III) are preferably not included in the coating compositions of the present invention. The mere simultaneous presence of silica and any of the species of formulae (II) and (III) is not to be confused with the rather elaborate formation of mesopourous silica nanocontainer encapsulated corrosion inhibitors as taught by Uleato et al. (see above). As stated above, it was one aim of the present invention to avoid the need for encapsulation of the corrosion inhibitor, i.e., the encapsulation of any of the species of formulae (II) and (III).

The weight ratio of pigments and/or fillers (A)b. to (A)a., i.e. the one or more polymers and/or resins comprising functional groups, which are reactive toward the functional groups of the one or more crosslinking agents comprised in hardener component (B) is preferably from 6:1 to 1:6, more preferred from 5:1 to 1:5, even more preferred from 5:1 to 1:2 or 5:1 to 1:1, such as 4:1 to 2:1.

(A)c. Species Containing a Structural Unit of Formula (I)

The master batch composition (A) further comprises one or more species containing a structural unit of formula (I)

(I)

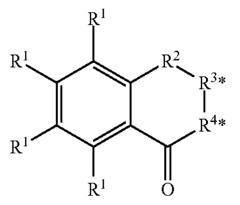

wherein two of the four residues $R^1$ are OH and the other two residues $R^1$ are H; $R^2$=O or C=O; and $R^3$—$R^4$ is C=C or HC—CH; with the asterisks * depicting binding sites to residues $R^5$ and $R^6$ in formula (II) below or the residue CH—CH—CH—CH in formula (III) below; and the one or more species being selected from the group consisting of species of formula (II)

(II)

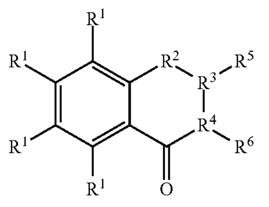

with $R^5$ being

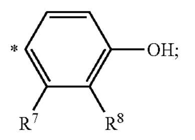

$R^6$=H or OH; and the asterisk depicting the binding site to $R^4$; and $R^7$ and $R^8$ are H or OH, with the proviso that at least one of $R^7$ and $R^8$ is H; and $R^2$=O; and species of formula (III)

(III)

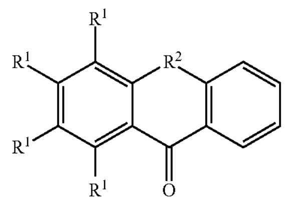

wherein $R^2$ is C=O.

The above species of formulae (II) and (III) and particularly preferred those, which are described below are contained in the coating composition of the present invention to employ the cured coatings with corrosion inhibiting properties.

Amongst the species represented by formula (II) species selected from the group consisting of flavonoles such as quercetin and morin; and flavanones such as naringenin are preferred.

Particularly preferred species of formula (II) are species of formula (IIa)

(IIa)

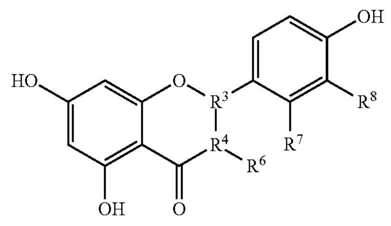

wherein $R^7$ and $R^8$ are defined as above; and a. wherein $R^6$ is OH and $R^3$—$R^4$ is C=C (flavonoles); or b. wherein $R^6$ is H and $R^3$—$R^4$ is HC—CH (flavanones).

In the most preferred species of formula (IIa) $R^3$—$R^4$ is C=C, $R^6$ and $R^8$=OH and $R^7$=H (i.e. quercetin).

Amongst the species represented by formula (III) species selected from the group consisting of dihydroxy anthraquinones are preferred. Most preferred are 1,4-dihydroxy anthraquinone and 1,2-dihydroxy anthraquinone (i.e. alizarin).

The species are being employed in the coating compositions without being encapsulated or otherwise associated to mesoporous silica nanocontainers as described by Ulaeto et al. Surprisingly and despite the fact that these species of formulae (II) and (III) contain several hydroxy groups and are therefore in principle apt to react with epoxy resins as well as with the free isocyanate group containing crosslinking agents, the coating compositions containing the respective species provide an excellent corrosion inhibition to metallic substrates, particularly aluminum containing metallic substrates, when applied thereon and cured afterwards.

The sum of the amounts of the species of formulae (II) and/or (III) as employed in the coating composition of the present invention preferably range from 1 ppm to 15 wt.-%, more preferred 0.1 to 5 wt.-% and most preferred 0.5 to 2.5 wt.-%, based on the total weight of the master batch component (A). If the amount is lower than the above lower limit, than no mitigation of corrosion effect is detectable, if the amount exceeds the above upper limit film forming may be hindered or the curing reaction may be poisoned.

Hardener Component (B)

The coating composition—as being a two-pack coating composition—comprises at least one crosslinking agent in the hardener component (B) such as: polyisocyanate crosslinking agents, having free isocyanate groups, which could be reactive with the hydroxyls as well as with active hydrogen containing groups (such as primary or secondary amino groups, for example) of the one or more polymers and/or resins contained in the master batch component (A); or e.g. polyamines which could be reactive with epoxy resins that might be contained in master batch component (A).

Since it is the essence of a two-pack composition to store the crosslinking component (B) separately from the master batch composition (A) to avoid any pre-mature crosslinking, hardener component (B) does not contain ingredients which are reactive towards the crosslinking agent. However, the crosslinking component may contain further inert ingredients, such as solvents or solvent mixtures wherein the crosslinking agents are dissolved or dispersed or further inert additives as described below.

Crosslinking Agents for Polyhydroxyl Functional Polymers and/or Resins

In case the functional groups of the at least one polymer and/or resin in the master batch component (A) are selected from hydroxyl groups, primary and secondary amino groups, it is particularly preferred to use one or more polyisocyanates (the term as used herein includes diisocyanates) having free isocyanate groups as crosslinking agents.

Examples of suitable polyisocyanate crosslinking agents include, without limitation, alkylene polyisocyanates such as hexamethylene diisocyanate, 4- and/or 2,4,4-trimethylhexamethylene diisocyanate, dodecamethylene diisocyanate, 1,4-diisocyanatocyclohexane, 1-isocyanato-3,3,5-trimethyl-5-isocyanatomethyl-cyclohexane (isophorone diisocyanate), 2,4'- and/or 4,4'-diisocyanatodicyclohexylmethane, 3-isocyanato-methyl-3,5,5-trimethyl cyclohexyl isocyanate, aromatic polyisocyanates such as 2,4'- and/or 4,4'-diisocyanatodiphenylmethane, 2,4- and/or 2,6-diisocyanatotoluene, naphthylene diisocyanate, and mixtures of these polyisocyanates. Generally, polyisocyanates having three or more isocyanate groups on average are used; these may be derivatives or adducts of diisocyanates. Useful polyisocyanates may be obtained by reaction of an excess amount of an isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol A, trimethylolpropane, trimethylolethane, 1,2,6-hexanetriol, glycerine, sorbitol or pentaerythritol), or by the reaction of the isocyanate with itself to give an isocyanurate. Examples include biuret-group-containing polyisocyanates, such as those described, for example, in U.S. Pat. Nos. 3,124,605 and 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162. and DE-OS 2,504,400, 2,537,685 and 2,552,350; allophanate group-containing polyisocyanates, such as those described, for example, in GB-PS 994,890, BE-PS 761,626 and NL-05 7,102,524; and uretdione group-containing polyisocyanates, such as those described in EP-A 0,377,177, each reference being incorporated herein by reference.

Such isocyanate crosslinking agents are commonly stored separately and combined with the polyhydroxyl-functional polymers and/or resins shortly before application.

Curing catalysts for the urethane reaction such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total solids.

Crosslinking Agents for Epoxy Resins

In the following crosslinking agents are described which are typically used for curing epoxy resins, which may be used in the master batch component (A) as resins comprising a functional group being reactive towards the functional groups present in the crosslinking agent contained in the hardener component (B). Crosslinking agents of this kind are designated in their function as "epoxide crosslinking agents", in line with the relevant literature (for example: Kittel, "Lehrbuch der Lacke und Beschichtungen", volume 2, 2$^{nd}$ edition, 1998, pp. 267 to 318).

The epoxide crosslinking agents are compounds with a functionality of two or more whose functional groups are able to react with oxirane groups (compounds having active hydrogen, in particular with hydrogen bonded to nitrogen or oxygen). The crosslinking agents are preferably employed substantially stoichiometrically relative to the epoxy resin. The concentration of the oxirane rings in the epoxy resin can be determined by means of titrimetry, for example. The amount of crosslinking agent required can be calculated from the equivalent weight of active hydrogen ("H-active equivalent weight") of the crosslinking agent.

The crosslinking agents which can be used in accordance with the invention are preferably those selected from the group consisting of polyamines (herein including diamines) and polyamides. Especially preferred are polyamines. In its most preferred embodiment, therefore, the curing agent may also be termed an amine crosslinking agent.

Particularly preferred polyamines may be selected from the group of aliphatic amines, such as diethylenetriamine, triethylenetetramine or 3,3',5-trimethylhexamethylene-diamine; cycloaliphatic amines, such as 1,2-cyclohexyldiamine, isophoronediamine and its isomer mixtures, or m-xylylenediamine; aromatic amines, such as methylenedianiline or 4,4-diaminodiphenyl sulfone; modified amines, such as Mannich bases (for example, diethylene triamine-phenol Mannich base), or amine adducts of 3,3',5-trimethylhexamethylenediamine and bisphenol-A-diglycidyl ether.

Particularly preferred epoxide crosslinking agents of the polyamide type are e.g. polyaminoamides or dicyandiamide.

Solvent Component (C)

The coating composition of the invention comprises, as component (C), at least one organic solvent. The concept of the "organic solvent" is familiar to the skilled person, from European Directive 1999/13/EC of Mar. 11, 1999, for example.

All organic solvents known to the skilled person are suitable as component (C) of the coating composition of the invention as long as they are not reactive towards the ingredients of the component wherein the solvent is used. Most preferred are aprotic organic solvents.

The at least one organic solvent is preferably selected from the group consisting aliphatic hydrocarbons, aromatic hydrocarbons, as for example toluene and/or xylenes, ketones, as for example acetone, N-methylpyrrolidone, N-ethylpyrrolidone, methyl isobutyl ketone, isophorone, cyclohexanone, and methyl ethyl ketone, esters, as for example methoxypropyl acetate, ethyl acetate, butyl glycol acetate, and butyl acetate, amides, as for example dimethylformamide, and mixtures thereof.

Further Optional Ingredients of the Coating Composition of the Invention

The coating composition of the invention may optionally comprise at least one further ingredient, such as typical additives as used in two-pack coating compositions.

Said at least one further ingredient or additive is preferably selected from the group consisting of antioxidants, antistats, wetting and dispersing agents, antisettling agents, emulsifiers, flow control assistants, solubilizers, defoaming agents, wetting agents, stabilizing agents, UV and/or light stabilizers, photoprotectants, deaerating agents, inhibitors, catalysts, waxes, flexibilizers, flame retardants, hydrophobizing agents, hydrophilizing agents, thixotropic agents, impact modifiers, processing auxiliaries, plasticizers, and mixtures of the aforementioned components. The amount of the preferably at least one further ingredient in the coating composition of the invention may vary very widely according to the intended use. The amount of the sum of such ingredients is preferably 0.01 to 10.0 wt %, more preferably 0.05 to 8.0 wt %, very preferably 0.1 to 6.0 wt %, especially preferably 0.1 to 5.0 wt %, based in each case on the total weight of the coating composition of the invention.

The further ingredients may be part of the master batch component (A), the hardener component (B) and the solvent component (C) or may be added in form of a separate component (D), instead. The further ingredients are preferably chemically inert towards the ingredients of the respective component wherein they are utilized.

Method for Producing a Coating Composition According to the Invention

The present invention additionally provides a method for producing the coating composition of the invention.

This method for producing the coating composition of the invention is carried out preferably by means of a high-speed stirrer, a dissolver or an inline dissolver, preferably maintaining the temperature during all mixing steps at a temperature below 50° C. by i. first mixing the (A)a. one or more polymers and/or resins comprising functional groups, which are reactive toward the functional groups of the one or more crosslinking agents comprised in hardener component (B) with at least part of the (A)b. one or more pigments and/or fillers, whereby the (A)a. one or more polymers and/or resins comprising functional groups, which are reactive toward the functional groups of the one or more crosslinking agents comprised in hardener component (B) are optionally and preferably pre-dissolved and/or pre-dispersed in at least a part of the organic solvent which is contained in the final coating composition;
ii. adding while mixing the rest of the A(b). one or more pigments and/or fillers, if not completely added in step i. and adding while mixing the one or more species of formulae (II) and/or (III), as defined above;
iii. grinding the thus obtained mixture, preferably by using a bead mill, preferably until the Hegman fineness is determined to be less than 25 μm, more preferred less than 23 μm and most preferred less than 20 μm; and
iv. adding hardener component (B) and optionally solvent component (C) and optionally component (D) under mixing conditions to achieve a homogenous coating composition.

Step iv. is preferably carried out in a spray gun as e.g. used in automotive refinish coating.

Method for Coating of a Substrate with a Coating Composition According to the Invention The present invention further provides a method for coating of a metallic substrate with a coating composition according to the invention, comprising at least a step (i) of contacting the metallic substrate with the coating composition of the invention.

The term "contacting" in the sense of the present invention refers preferably to spraying the coating composition of the present invention onto the substrate for forming a coating layer on the substrate.

Such spraying may preferably take place by electrostatic spraying, by air-spray coating or by airless spray coating. The dry film thickness of the resultant coating film falls preferably within a range from 25 to 100 μm, more particularly 30 to 90 μm, and most preferably 40 to 80 μm, when dried for 60 min at 23° C. The coating film may be cured, preferably by heating it to a temperature in the range from 18 to 90° C., more preferred 30 to 80° C. and most preferred 50 to 70° C. for 5 to 120 minutes.

However, the curing step to full cure of the coating layer can be at least partially omitted, if a thus coated substrate, which is preferably at least partially dried, is further coated with a subsequent coating composition such as a topcoat coating composition or clear coat coating composition and fully cured together with such subsequently applied coating layer. This possibility of a wet-on-wet coating method is further described below, when describing the method for coating of a substrate with a multilayer coating.

Metallic Substrates

The substrates used in accordance with the invention are preferably selected from the group consisting of iron, steel, aluminum, or alloys thereof, more particularly of aluminum-based alloys, it being possible for these alloys to have optionally at least one further metal and/or semimetal, such as copper, for example. Preferably the substrates here each have at least one surface of iron, steel, aluminum, or alloys thereof, and more preferably they consist entirely of iron, steel, aluminum, or alloys thereof. Suitable steel is preferably steel selected from the group consisting of cold-rolled steel, hot-rolled steel, high-strength steel, galvanized steel such as dip-galvanized steel, alloy-galvanized steel (such as Galvalume®, Galvannealed®, or Galfan®, for example), and aluminized steel. Examples of suitable alloys are aluminum-copper alloys. Especially preferred are substrates made of aluminum or alloys containing aluminum.

The substrates used may here in particular be metallic bodies of automobiles and commercial vehicles, but also aircrafts, boats and the like.

Before being coated with the coating composition of the invention, the metallic substrate used in accordance with the method for coating a substrate according to the invention may be pretreated with a suitable, preferably aqueous, pretreatment composition. Such pretreatment compositions are known to the skilled person and are available commercially. For example, substrates of aluminum, based on aluminum or on an alloy containing aluminum can be pretreated by means of tartaric-sulfuric acid anodizing (TSA) as per DIN EN 4704 (date: May 2012). Substrates of steel or based on steel may be pretreated by means of a pretreatment as per DIN EN ISO 12944-4 (date: July 1998), for example. The grade of the steel or steel-based substrates used is preferably at least 2.5. Steel grade may be determined as per DIN EN ISO 8501-1 (date: December 2007).

All preferred embodiments described hereinabove in connection with the coating composition of the invention are also preferred embodiments of the coating composition of the invention used in the method of the invention for the coating of a substrate.

Method for Coating of a Substrate with a Multilayer Coating

The present invention further provides a method for coating of a substrate with a multilayer coating, comprising at least the steps of (i) contacting the metallic substrate with the coating composition of the invention for the application of the coating composition to the substrate, particularly preferred by spray coating, and (ii) applying a further coating composition, preferably a topcoat coating composition or a clearcoat coating composition, preferably by spray coating, to the coating layer formed by applying the coating composition in step (i).

All preferred embodiments described hereinabove in connection with the coating composition of the invention are also preferred embodiments of the coating composition of the invention used in the method of the invention for the coating of a substrate with a multilayer coating. The same applies for the metallic substrates described for the method for coating a substrate with a primer and/or filler coat.

A further coating composition, more particularly a topcoat coating composition or clearcoat coating composition, most preferably a topcoat coating composition, is customarily applied to the coating layer formed in step (i). The coating layer formed in step (i) is preferably dried prior to the application of the further coating compositions as per step (ii). The term "drying" refers, in the context of the present invention, preferably to the removal of at least a part of the solvent from the applied coating material. Drying may take place initially at 15 to 30° C. for 10 to 120 minutes. While during drying some curing may occur, it is preferred that the layer formed in step (i) is not or at least not completely cured (wet-on-wet method).

The general techniques for applying the further coating compositions as per step (ii) are in line with those described above for the coating layer formed from the coating composition according to the invention. The further coating compositions, such as the topcoat coating composition, is applied in the customary and known film thicknesses, as for example in dry film thicknesses after curing in the range from 15 to 100 μm, more particularly 40 to 80 μm or 50 to 75 μm.

The curing takes place in accordance with the customary and known techniques such as, for example, heating in a forced air oven or by irradiation with IR lamps. Also possible is actinic curing by means of UV radiation, for example, in the case of radiation-curing systems. Curing may take place, for example, in the range from about 15° C. or at elevated temperatures up to 90° C., preferably in the range from 40 to 80° C., such as 50 to 70° C. The duration of the curing phase as well is selected individually. For example, curing may take place over a period of 5 to 120 minutes, preferably 15 minutes to 45 minutes. Curing may optionally also be preceded by a flashing phase or preliminary drying phase, preferably at room temperature (i.e. in the context of this invention 23° C.) for a duration of 1 to 60 minutes, for example. Particular preference is given to drying or curing, preferably at 40 to 80° C., more preferred 50 to 70° C., for a duration of 15 min to 2 hours after step (ii) has been carried out.

Further provided by the present invention is a multilayer coating obtainable by the method of the invention.

The present invention additionally provides a metallic substrate coated with the coating composition of the invention. The present invention further provides a component or article produced from at least one thus coated substrate. The substrates suitable to be used in this method are the same as the substrates described herein above.

Use of the Species According to Formulae (II) and (III) to Provide Anticorrosive Properties The present application also relates to the use of one or more species of formulae (II) and (III) as defined above in solvent-borne, two-pack coating compositions, particularly to provide anticorrosive properties to the cured coatings formed from the coating compositions.

All embodiments of preferred species according to formulae (II) and (III) and all embodiments related to the parts of the solvent-borne, two-pack coating compositions as described hereinabove in connection with the coating composition of the invention are also preferred embodiments of the use of the invention.

In the following, the invention will be further exemplified by way of experimental data.

EXAMPLES

Tests

Acidic Acid Salt Spray Test (AASS)

The acidic acid salt spray mist test (AASS) is used for determining the corrosion resistance of a coating on a substrate. In accordance with DIN EN ISO 9227 (date: June 2017), the acidic acid salt spray mist test is carried out for coated electrically conductive substrates, namely aluminum. The samples for investigation here are in a chamber in which there is continuous misting with a 5% common salt solution with a controlled pH in the range from 3.1 to 3.3 at a temperature of 35° C. over a duration of 1008 hours. The mist deposits on the samples under investigation, covering them with a corrosive film of salt water.

Prior to the acidic acid salt spray mist test to DIN EN ISO 9227 AASS, the coatings on the samples under investigation are scored down to the substrate with a blade incision, allowing the samples to be investigated for their level of under-film corrosion (undermining) to DIN EN ISO 4628-8 (date: Mar. 1, 2013), since the substrate corrodes along the score line during the DIN EN ISO 9227 AASS salt spray mist test. As a result of the progressive process of corrosion, the coating is undermined to a greater or lesser extent during the test. The degree of undermining in [mm] is a measure of the resistance of the coating to corrosion. The average undermining level stated in the results below represents the average value of the individual values from three to five different panels assessed, with each individual value for a panel in turn being an average value of the undermining levels at 11 measurement points on the panel.

Gloss, Blistering and Adhesion

Gloss and adhesion testing were determined prior to and after constant climate testing of 240 h exposure duration. After constant climate testing, the formation of blistering was evaluated, as well. Climate Constant climate testing was performed according to EN ISO 6270-2 (April 2018) using an exposure time of 240 h.

The gloss has been evaluated according to DIN EN 13523-2 (August 2014) under an angle of 60° at 10 different spots of one coated specimen prior and after constant climate testing. The average value was reported in the results with a precision of one digit.

The assessment of the blistering grade is made according to the density of the blisters and their size according to DIN EN ISO 4628-2 (July 2016). The assessment has been performed directly after constant climate testing and subsequent relaxation period in ambient conditions (22° C., 50% r.h.) for 1 h and 24 h.

Adhesion assessment was done by means of cross cut testing according to ISO 2409 using a multi-blade cutting tool to prepare a crosshatch pattern through the coating to the substrate. Detached parts of the coating were removed by brushing with a soft brush. Subsequently, an adhesive tape was applied and removed over the cross hatch to remove all detached parts of the coating. Classification has been done according to ISO 2409, Table 1. Cross hatch testing has been performed before as well as after constant climate control testing. After climate control testing cross hatch testing has been performed after a recovery time of 1 h and 24 h. The cross hatch has been covered by an adhesive tape during climate control testing to avoid corrosion in the prepared cross hatch.

Filler Coating Compositions

Solvent-Borne, 2-Pack Hydroxyl/Isocyanate Filler Coating Composition

In Table 1 the ingredients (in parts by weight) of a Comparative Filler Coating Compositions C1 and C2 and Inventive Filler Coating Compositions E1 to E4 are listed. Master Batch Composition (A) ("A pack") contains a hydroxyl group containing polymer (polyacrylate polyol), a pigment and a filler ($TiO_2$ and $BaSO_4$) and solvents (xylene and butyl acetate) and in case of the inventive examples 0.50 or 1.00 part by weight of a corrosion inhibitor (11, 13 and 14) and in case of Comparative Composition C2 1 part by weight of 3-methyl anthraquinone (12). Hardener Component (B) ("B pack") contains an isocyanate groups containing aliphatic hardener and a solvent mixture.

Positions 1 to 7 and 10 in Table 1 are in parts by weight as 100% solids. However, the polyacrylate polyol of position 1 was used pre-dispersed in butyl acetate/xylene (3:1; w/w) as a dispersion having a solids content of 65 wt.-%. The solvent content of this dispersion was allotted to positions 8 and 9 while only the solids content of this dispersion is allotted to position 1. Furthermore, the isocyanate hardener of position 10 was used pre-dissolved in the solvent mixture of position 11.

To prepare the inventive Filler Coating Compositions E1 to E4 containing the different corrosions inhibitors 11, 13 and 14 and the comparative Filler Coating Composition C2 (with substance 12), the amounts of positions 1, 2, 3, 8 and 9 as used in the Comparative Filler Coating Composition C1 were reduced in a manner to maintain for all Filler Coating Compositions an identical pigment-to-polyacrylate polyol weight ratio of 74:26 in Master Batch Component (A) and an approximate solvent content of 21 wt.-% of Master Batch Component (A). The amount of isocyanate hardener in Hardener Component (B) was chosen to result in a molar ratio of OH (from the polyacrylate polyol) to NCO groups (from the isocyanate hardener) being 1:1.08.

For all Filler Coating Compositions positions 1 and 2 were supplied in a mixing container, and positions 3 to 9 were added, while mixing at about 1000 to 1500 rpm. Subsequently, the resulting mixtures were mixed in a dissolver (VMA Getzmann, Dispermat CN20) for further 30 min at about 1500 rpm, maintaining a temperature below 50° C. (C1: about 47° C.; E1 to E5: about 36° C.). For Composition C1 the Hegman fineness was determined to be about 23 μm (DIN EN ISO 1524, June 2013). The inventive Filler Coating Compositions E1 to E4 and the comparative filler coating Composition C2 were further milled in a bead mill (0.5 L milling container; 200 g Siliquarzit® pearls 1.8-2.2 mm per 400 g Master Batch Component (A)) for varying times (C2: 45 min; E1: 90 min; E2: 300 min; E3: 50 min; and E4: 60 min) at about 2000 to 2100 rpm under maximum cooling, resulting in Hegman finenesses below about 23 μm (C2: 23 μm E1: 20 μm; E2: 20 μm; E3: <23 μm; and E4: <23 μm).

To obtain the final Filler Coating Compositions C1, C2 and E1 to E4, which were applied to the aluminum alloy panels, Master Batch Component (A) and Hardener Component (B) were thoroughly mixed and diluted with a Solvent Composition S (1-Methoxypropylacetat, 2-Butylacetat and Xylol; for C1: 0 wt %; and for C2, E1-E4 approx. 10 wt.-%) to a DIN Cup 4 spray application viscosity at 20° C. of about 19 to about 22 seconds.

TABLE 1

Filler Coating Compositions (2-pack OH/NCO systems)

| | | Filler Coating Compositions | | | | | |
|---|---|---|---|---|---|---|---|
| Pos. | Ingredients | C1 | C2 | E1 | E2 | E3 | E4 |
| | | Master Batch Component (A) | | | | | |
| 1 | polyacrylate polyol[1] | 20.48 | 20.26 | 20.26 | 20.37 | 20.26 | 20.26 |
| 2 | $TiO_2$ | 32.97 | 32.64 | 32.64 | 32.80 | 32.64 | 32.64 |
| 3 | $BaSO_4$ | 25.36 | 25.11 | 25.11 | 25.23 | 25.11 | 25.11 |
| 4 | I1[2] | — | — | 1.00 | 0.50 | — | — |
| 5 | I2[3] | — | 1.00 | — | — | — | — |
| 6 | I3[4] | — | — | — | — | 1.00 | — |
| 7 | I4[5] | — | — | — | — | — | 1.00 |
| 8 | xylene | 5.37 | 5.37 | 5.37 | 5.35 | 5.37 | 5.37 |
| 9 | butyl acetate | 15.82 | 15.66 | 15.66 | 15.75 | 15.66 | 15.66 |
| | Sum | 100.00 | 100.04 | 100.04 | 100.00 | 100.04 | 100.04 |

TABLE 1-continued

Filler Coating Compositions (2-pack OH/NCO systems)

| Pos. | Ingredients | C1 | C2 | E1 | E2 | E3 | E4 |
|---|---|---|---|---|---|---|---|
| | | Filler Coating Compositions | | | | | |
| | | Hardener Component (B) | | | | | |
| 10 | isocyanate hardener[6] | 10.82 | 10.70 | 10.70 | 10.75 | 10.70 | 10.70 |
| 11 | solvent mixture[7] | 12.20 | 12.06 | 12.06 | 12.13 | 12.06 | 12.06 |

[1]polyacrylate polyol (solids; OH number: 149 mg KOH/g; hydroxyl equivalent weight: 378)
[2]1,4-dihydroxy anthraquinone
[3]3-methyl anthraquinone (not inventive)
[4]alizarine (1,2-dihydroxy anthraquinone)
[5]quercetin
[6]mixture of aliphatic polyisocyanate oligomers based on IPDI and HDI
[7]mixture of the following solvents used to dilute position 10

Solvent-Borne, 2-Pack Epoxy/Amine Filler Coating Composition

In Table 2 the ingredients (in parts by weight) of Comparative Filler Coating Compositions C3 and C4 and Inventive Filler Coating Compositions E5 to E8 are listed. Master Batch Component (A) ("A pack") contains epoxy resins, a wetting and dispersing additive, pigments ($TiO_2$, $BaSO_4$ and platelet-shaped talc) and solvents (xylene, methoxypropanol, isobutanol) and in case of the inventive examples 0.50 or 1.00 part by weight of a corrosion inhibitor (11, 13 and 15). Hardener Component (B) ("B pack") contains an amine groups containing hardener mixture and a solvent mixture.

Positions 1 to 9 and 17 in Table 2 are in parts by weight as 100% solids. However, the epoxy resin mixture of position 1 was used pre-dispersed in the solvents of positions 10 and 11 and the wetting and dispersion agent was pre-dissolved in positions 12 and 13. Furthermore, the amine hardener mixture of position 17 was used pre-dissolved in the solvent mixture of position 18.

To prepare the inventive Filler Coating Compositions E5 to E8 and comparative Filler Coating Composition C4 containing the different corrosions inhibitors 11, 13 and 14 an non-inventive compound 12, the amounts of positions 1 to 5, 14 and 15 as used in the Comparative Filler Coating Composition were reduced in a manner to maintain for all Filler Coating Compositions an identical pigment-to-epoxy resin weight ratio of 70:30 in Master Batch A and an approximate solvent content of 24 wt.-% of Master Batch Component (A). The amount of amine hardener mixture in Hardener Component (B) was chosen to result in a molar ratio of epoxy groups (from the epoxy resin mixture) to amine groups (from the amine hardener mixture) being 100:16.45.

For all Filler Coating Compositions positions 1, 10 and 11 were supplied in a mixing container and position 2 (pre-mixed with positions 12 and 13) was added. The mixture was mixed in a dissolver (VMA Getzmann, Dipermat CN20) for 10 min at 1500 rpm, subsequently 15, 4, 5 and 14 were added in this order, followed by positions 6 to 9 and finally 3. Subsequently, the resulting mixtures were mixed in a dissolver for further 30 min at about 1500 rpm, maintaining a temperature between 33 and 36° C. The Filler Coating Compositions were further milled in a bead mill (0.5 L milling container; 202 g Siliquarzit® pearls 1.8-2.2 mm per 400 g Master Batch A) for varying times (C3: 70 min; C4: 70 min; E5: 60 min; E6: 60 min; E7: 70 min; and E8: 90 min) at about 2000 rpm under cooling, resulting in Hegman finenesses (after 4:1 dilution in butyl glycol acetate) below about 23 μm (C3: 10 μm; C4: 20 μm; E5: <20 μm; E6: 20 μm; E7: 20 μm; and E8: 23 μm). The Hegman fineness was determined as described above.

To obtain the final Filler Coating Compositions C3, C4 and E5 to E8, which were applied to the aluminum alloy panels, Master Batch A and Hardener Composition B were thoroughly mixed and diluted with a Solvent Composition S (1-Methoxypropylacetat, 2-Butylacetat and Xylol; for C3: approx. 5 wt %; for C4, E5, E7 and E8: approx. 15 wt %; and for E6: approx. 13 wt.-%) to a DIN Cup 4 spray application viscosity at 20° C. of about 19 to about 22 seconds.

TABLE 2

Filler Coating Compositions (2-pack epoxy/amine systems)

| Pos. | Ingredients | C3 | C4 | E5 | E6 | E7 | E8 |
|---|---|---|---|---|---|---|---|
| | | Filler Coating Compositions | | | | | |
| | | Master Batch A | | | | | |
| 1 | Epoxy resin mixture[7] | 22.90 | 22.68 | 22.68 | 22.79 | 22.68 | 22.68 |
| 2 | wetting and dispering agent | 0.17 | 0.17 | 0.17 | 0.17 | 0.17 | 0.17 |
| 3 | $TiO_2$ | 10.19 | 10.09 | 10.09 | 10.14 | 10.09 | 10.09 |
| 4 | $BaSO_4$ | 18.34 | 18.16 | 18.16 | 18.25 | 18.16 | 18.16 |
| 5 | Talcum | 24.35 | 24.11 | 24.11 | 24.23 | 24.11 | 24.11 |
| 6 | I1[8] | — | — | 1.00 | 0.50 | — | — |

TABLE 2-continued

Filler Coating Compositions (2-pack epoxy/amine systems)

| Pos. | Ingredients | C3 | C4 | E5 | E6 | E7 | E8 |
|---|---|---|---|---|---|---|---|
| | | Filler Coating Compositions | | | | | |
| 7 | I2[9] | — | 1.00 | — | — | — | — |
| 8 | I3[10] | — | — | — | — | 1.00 | — |
| 9 | I4[11] | — | — | — | — | — | 1.00 |
| 10 | xylene[12] | 4.73 | 4.68 | 4.68 | 4.71 | 4.68 | 4.68 |
| 11 | isobutanol[12] | 1.54 | 1.54 | 1.54 | 1.54 | 1.54 | 1.54 |
| 12 | Methoxy propyl acetate[13] | 0.33 | 0.33 | 0.33 | 0.33 | 0.33 | 0.33 |
| 13 | butyl acetate[13] | 0.06 | 0.06 | 0.06 | 0.06 | 0.06 | 0.06 |
| 14 | xylene | 12.94 | 12.81 | 12.81 | 12.87 | 12.81 | 12.81 |
| 15 | methoxy propanol | 3.45 | 3.43 | 3.43 | 3.45 | 3.43 | 3.43 |
| 16 | butyl acetate/ xylene mixture | 1.00 | 0.94 | 0.94 | 0.96 | 0.94 | 0.94 |
| | Sum | 100.0 | 100.0 | 100.0 | 100.0 | 100.0 | 100.0 |
| | | Hardener Component B | | | | | |
| 17 | amine hardener mixture[14] | 7.47 | 7.38 | 7.38 | 7.43 | 7.38 | 7.38 |
| 18 | solvent mixture[15] | 9.13 | 9.02 | 9.02 | 9.08 | 9.02 | 9.02 |

[7] epoxy resin mixture (84 wt.-% epoxy resin A: epoxy group content: 3800-4250 mmol/kg; 16 wt.-% epoxy resin B: Beckopox EM 460 without solvents content)
[8] 1,4-dihydroxy anthraquinone
[9] 3-methyl anthraquinone (not inventive)
[10] alizarine (1,2-dihydroxy anthraquinone)
[11] quercetin
[12] used to disperse the epoxy resin mixture of position 1
[13] used to dissolve the wetting and dispersing agent of position 2
[14] proprietary mixture of oligomeric and polymeric amines (amine number: about 270 ± 20 mg KOH/g)
[15] proprietary solvent mixture used to dissolve the amine hardener mixture of position 16

Application of Coating Compositions

Application of 2-Pack Hydroxyl/Isocyanate Systems and Overcoating with Top Coat

Inventive Filler Coating Compositions E1 to E4 and Comparative Filler Coating Compositions C1 and C2 were applied by spraying (Spray gun: SATA 3000 RP, nozzle 1.3 mm, pressure 2.5 bar) onto aluminum alloy panels (AA6014 for the AASS test; and AlMgMn4.5 for the other tests). Subsequent to the application, the resulting films were dried for 60 min at room temperature (23° C.) (dry film thicknesses of the filler coatings: 58±9 μm, except for Coating Composition E3: 39 μm).

The thus obtained filler coating films were overcoated by spray application spraying (Spray gun: SATA 3000 RP, nozzle: 1.4 mm, pressure: 2.5 bar) with a white top coat (Master Batch: Series 68 CV, Product Number: 68-RAL 9010; Hardener: Hardener CV, Product Number: 922-138; Thinner: Product Number: 352-216; 4:1:1 (v/v/v); all available from BASF Coatings GmbH), dried for 30 min at 60° C., resulting in a dry film thickness of 66 μm.

Application of 2-Pack Epoxy/Amine Systems and Overcoating with Top Coat

Inventive Filler Coating Compositions E5 to E8 and Comparative Filler Coating Compositions C3 and C4 were applied by spraying (Spray gun: SATA 100BF RP, nozzle: 1.6 mm, pressure: 2.5 bar). Subsequent to the application the resulting films were dried for 60 min at room temperature (23° C.) (dry film thicknesses of the filler coatings: 52±6 μm, except for Coating Composition C2: 71 μm).

The thus obtained filler coating films were overcoated by spray application spraying (Spray gun: SATA 3000 RP, nozzle: 1.4 mm, pressure: 2.5 bar) with a white top coat (Master Batch: Series 68 CV, Product Number: 68-RAL 9010; Hardener: Hardener CV, Product Number: 922-138; Thinner: Product Number: 352-216; 4:1:1 (v/v/v); all available from BASF Coatings GmbH), dried for 30 min at 60° C., resulting in a dry film thickness of 58 μm.

Results of Corrosion Testing

TABLE 3

Results for C1, C2 and E1 to E4

| Filler Coating Composition | AASS test (30 days; rinse with DI water) scratching after 1 h [mm] | scratching after 24 h [mm] |
|---|---|---|
| C1 | 3.7 | 4.2 |
| C2 | 3.3 | 3.1 |
| E1 | 1.5 | 2.0 |
| E2 | 2.7 | 2.1 |
| E3 | 3.0 | 2.8 |
| E4 | 1.0 | 0.7 |

As shown in Table 3 the inventive Filler Coating Compositions E1 to E4 were highly superior in the AASS test compared to the Comparative Filler Coating Composition C1 not containing a corrosion inhibitor and Comparative Filler Coating Composition C2 being hydroxyl-group-free 3-methyl anthraquinone. Even Coating Composition E3 showed still good corrosion inhibition in spite of the reduced dry layer thickness of this example compared to the others.

Furthermore, results of cross-cut testing, gloss (60°) testing and determination of number/size of blisters on aluminum alloy panels (AlMgMn4.5) subjected to the Constant Climate Test (CCT; 240 h) were highly satisfactory and showed no negative effects of the corrosion inhibitors on any of the tested parameters.

TABLE 4

| Results for C3, C4 and E5 to E8 | | |
|---|---|---|
| | AASS test (30 days; rinse with DI water) | |
| Filler Coating Composition | scratching after 1 h [mm] | scratching after 24 h [mm] |
| C3 | 6.9 | 7.1 |
| C4 | 2.7 | 2.9 |
| E5 | 2.1 | 1.7 |
| E5 | 0.9 | 1.1 |
| E7 | 1.7 | 1.3 |
| E8 | 0.9 | 1.1 |

As shown in Table 4 the inventive Filler Coating Compositions E5 to E8 were highly superior in the AASS test compared to the Comparative Filler Coating Composition C3 not containing a corrosion inhibitor, in spite of the fact that the Comparative Filler Coating Composition C3 was applied in higher dry film thickness. Comparative Filler Coating Composition C4 being hydroxyl-group-free 3-methyl anthraquinone was clearly less effective compared to the corrosion inhibitors used in inventive Filler Coating Compositions E5 to E8.

The invention claimed is:

1. A solvent-borne, two-pack coating composition, comprising (A) a master batch composition comprising a. one or more polymers and/or resins comprising functional groups, which are reactive toward the functional groups of the one or more crosslinking agents comprised in hardener component (B);

b. one or more pigments and/or fillers; and c. one or more species containing a structural unit of formula (I)

(I)

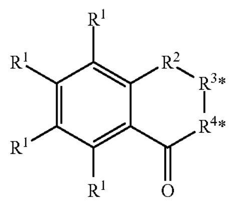

wherein two of the four residues $R^1$ are OH and the other two residues $R^1$ are H; $R^2$=O or C=O; and $R^3$—$R^4$ is C=C or HC—CH; with the asterisks * depicting binding sites to residues $R^5$ and $R^6$ in formula (II) below or the residue CH—CH—CH—CH in formula (III) below; and the one or more species being selected from the group consisting of species of formula (II)

(II)

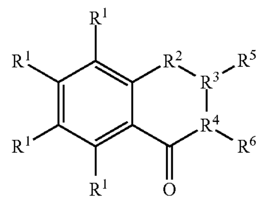

wherein $R^5$ is

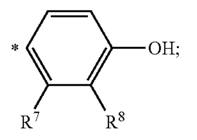

and $R^6$=H or OH, the asterisk depicting the binding site to $R^4$; $R^2$=O; and $R^7$ and $R^8$ are H or OH, with the proviso that at least one of $R^7$ and $R^8$ is H; and/or species of formula (III)

(III)

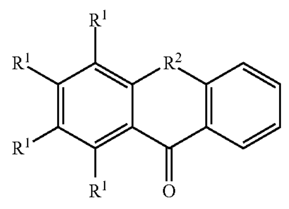

wherein $R^2$ is C=O, wherein the compounds of formulae (II) and (III) are not encapsulated in mesoporous silica nanocontainers; and (B) a hardener composition comprising one or more crosslinking agents comprising functional groups, which are reactive towards the functional groups of the one or more polymers and/or resins; and optionally (C) a diluent composition.

2. The solvent-borne, two pack coating composition according to claim 1, wherein the species of formula (II) are species of formula (IIa)

(IIa)

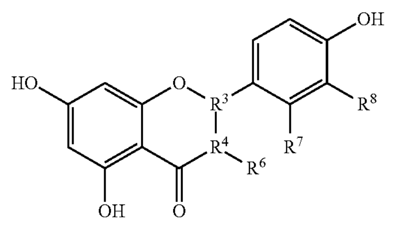

wherein $R^7$ and $R^8$ are H or OH, with the proviso that at least one of $R^7$ and $R^8$ is H; and a. wherein $R^6$ is OH and $R^3$—$R^4$ is C=C; or b. wherein $R^6$ is H and $R^3$—$R^4$ is HC—CH.

3. The solvent-borne, two pack coating composition according to claim 1, wherein the species of formula (II) are selected from the group consisting of quercetin, morin and naringenin; and the species of formula (III) are selected from the group consisting of 1,2-dihydroxy anthraquinone and 1,4-dihydroxy anthraquinone.

4. The solvent-borne, two pack coating composition according to claim 1, wherein the species containing a structural unit of formula (I) is quercetin.

5. The solvent-borne, two pack coating composition according to claim 1, wherein the one or more polymers and/or resins comprising functional groups, which are reactive toward the functional groups of the one or more crosslinking agents comprised in hardener component (B) are polyhydroxyl functional polymers and/or resins and the one or more crosslinking agents are polyisocyanates having free isocyanate groups; or wherein the one or more polymers and/or resins comprising functional groups, which are reactive toward the functional groups of the one or more crosslinking agents comprised in hardener component (B) are epoxy resins and the one or more crosslinking agents are selected from the group consisting of polyamines and polyamidines.

6. The solvent-borne, two pack coating composition according to claim 1, wherein the weight ratio of the (A)b. sum of pigments and fillers to the (A)a. one or more polymers and/or resins comprising functional groups, which are reactive toward the functional groups of the one or more crosslinking agents comprised in hardener component (B) is from 1:5 to 5:1.

7. The solvent-borne, two pack coating composition according to claim 1, which is a primer coating composition or a filler composition or both.

8. The solvent-borne, two pack coating composition according to claim 1, having a DIN cup 4 viscosity below 30 seconds (DIN 53211:1987-06).

9. The solvent-borne, two-pack coating composition according to claim 1, wherein the one or more species of formulae (II) and/or (III) in total are contained in the master batch composition (A) in an amount from 1 ppm to 15 wt.-%, based on the total weight of the master batch composition (A).

10. A method of producing a solvent-borne, two-pack coating composition according to claim 1, characterized by i. first mixing the (A)a. one or more polymers and/or resins comprising functional groups, which are reactive toward the functional groups of the one or more crosslinking agents comprised in hardener component (B) with at least part of the (A)b. one or more pigments and/or fillers, whereby the (A)a. one or more polymers and/or resins comprising functional groups, which are reactive toward the functional groups of the one or more crosslinking agents comprised in hardener component (B) are optionally pre-dissolved and/or pre-dispersed in at least a part of the organic solvent which is contained in the final coating composition;

ii. adding while mixing the rest of the A(b). one or more pigments and/or fillers, if not completely added in step i. and adding while mixing the one or more species of formulae (II) and/or (III);

iii. grinding the thus obtained mixture; and iv. adding hardener component (B) and optionally solvent component (C) under mixing conditions to achieve a homogenous coating composition.

11. A method for coating of a metallic substrate with a coating composition according to claim 1, comprising at least a step (i) of contacting the metallic substrate with the coating composition of the invention.

12. The method for coating of a metallic substrate with a coating composition according to claim 11, wherein the metallic substrate is aluminum or contains aluminum.

13. A coated metallic substrate, obtainable by the method according to claim 11.

14. A method for coating of a substrate with a multilayer coating, comprising at least the steps of (i) contacting the metallic substrate with the coating composition according to claim 1 for the application of the coating composition to the substrate, and (ii) applying a further coating composition to the coating layer formed by applying the coating composition in step (i).

15. The method for coating of a substrate with a multilayer coating according to claim 14, wherein the metallic substrate is aluminum or contains aluminum.

16. A multilayer-coated metallic substrate obtained by claim 14.

17. A method of using the solvent-borne, two-pack coating composition according to claim 1, the method comprising using the solvent-borne, two-pack coating composition to provide anticorrosive properties to cured coatings formed from the coating composition.

18. A method of producing a solvent-borne, two-pack coating composition according to claim 1, characterized by i. first mixing the (A)a. one or more polymers and/or resins comprising functional groups, which are reactive toward the functional groups of the one or more crosslinking agents comprised in hardener component (B) with at least part of the (A)b. one or more pigments and/or fillers, whereby the (A)a. one or more polymers and/or resins comprising functional groups, which are reactive toward the functional groups of the one or more crosslinking agents comprised in hardener component (B) are pre-dissolved and/or pre-dispersed in at least a part of the organic solvent which is contained in the final coating composition;

ii. adding while mixing the rest of the A(b). one or more pigments and/or fillers, if not completely added in step i. and adding while mixing the one or more species of formulae (II) and/or (III);

iii. grinding the thus obtained mixture using a bead mill; and iv. adding hardener component (B) and optionally solvent component (C) under mixing conditions to achieve a homogenous coating composition.

19. A method for coating of a substrate with a multilayer coating, comprising at least the steps of (i) contacting the metallic substrate with the coating composition according to claim 1 for the application of the coating composition to the substrate, by spray coating, and (ii) applying a further coating composition to the coating layer formed by applying the coating composition in step (i).

20. A method for coating of a substrate with a multilayer coating, comprising at least the steps of (i) contacting the metallic substrate with the coating composition according to claim 1 for the application of the coating composition to the substrate, and (ii) applying a topcoat coating composition or a clearcoat coating composition to the coating layer formed by applying the coating composition in step (i).

* * * * *